United States Patent
Roosli (10) Patent No.: US 10,218,529 B2
(45) Date of Patent: Feb. 26, 2019

(54) AUTOMATION SYSTEM FOR DEPLOYMENT IN A BUILDING

(71) Applicant: Philipp Roosli, Niantic, CT (US)

(72) Inventor: Philipp Roosli, Niantic, CT (US)

( * ) Notice: Subject to any disclaimer, the term of this patent is extended or adjusted under 35 U.S.C. 154(b) by 0 days.

(21) Appl. No.: 15/836,464

(22) Filed: Dec. 8, 2017

(65) Prior Publication Data

US 2019/0020494 A1   Jan. 17, 2019

Related U.S. Application Data

(60) Provisional application No. 62/531,127, filed on Jul. 11, 2017.

(51) Int. Cl.
| | | |
|---|---|---|
| *G06K 9/00* | (2006.01) | |
| *G05B 15/02* | (2006.01) | |
| *H04L 12/24* | (2006.01) | |
| *H04L 12/28* | (2006.01) | |
| *H04L 29/12* | (2006.01) | |
| *H05B 33/08* | (2006.01) | |
| *H05B 37/02* | (2006.01) | |

(52) U.S. Cl.
CPC .......... *H04L 12/2807* (2013.01); *G05B 15/02* (2013.01); *G06K 9/00335* (2013.01); *G06K 9/00691* (2013.01); *H04L 29/12207* (2013.01); *H04L 41/12* (2013.01); *G05B 2219/2642* (2013.01); *H05B 33/0845* (2013.01); *H05B 37/0227* (2013.01)

(58) Field of Classification Search
None
See application file for complete search history.

(56) References Cited

U.S. PATENT DOCUMENTS

| | | |
|---|---|---|
| 9,661,120 B1 | 5/2017 | Skeffington et al. |
| 2013/0219034 A1* | 8/2013 | Wang .................. H04L 12/2809 709/222 |
| 2016/0070276 A1 | 3/2016 | Joshi et al. |

(Continued)

OTHER PUBLICATIONS

Hong, et al., Towards Automatic Spatial Verification of Sensor Placement in Buildings, ACM 2013, 8 pages.

(Continued)

*Primary Examiner* — Sean Shechtman
(74) *Attorney, Agent, or Firm* — Cantor Colburn LLP (57) ABSTRACT

An automation system is provided for deployment in a building with rooms and includes computing resources which are receptive of contextual information and an electronic device cluster in each room. Each electronic device cluster includes electronic devices at least one of which gathers environmental information within the room and at least one of which communicates the environmental information to the computing resources. Descriptors of one or more electronic devices of a portion of the electronic device clusters are undefined at an initial time. The computing resources are configured to compare the contextual and environmental information from at least one electronic device cluster, identify a location and a use of the one or more electronic devices of the portion of the electronic device clusters based on comparison results and assign descriptors to the one or more electronic devices accordingly and communicate with the one or more electronic devices using the descriptors.

5 Claims, 9 Drawing Sheets

(56) References Cited

U.S. PATENT DOCUMENTS

2016/0195864 A1 7/2016 Kim
2017/0187807 A1 6/2017 Clernon
2018/0083916 A1* 3/2018 Xu .......................... H04L 47/13

OTHER PUBLICATIONS

Govindraju, "Sensing Locations: Occupancy Sensor Data Driven Automatic Determination of Sensor Locations in Buildings", Delft University of Technology Master's Thesis in MSc Embedded Systems, Sep. 1, 2016, 70 pages, Netherlands.

Hong, et al., "Towards Automatic Spatial Verification of Sensor Placement in Buildings", BuildSys'13 Proceedings of the 5th ACM Workshop on Embedded Systems for Energy-Efficient Buildings, Nov. 11-15, 2013, pp. 1-8, ACM, New York, NY, USA.

* cited by examiner

AUTOMATION SYSTEM FOR DEPLOYMENT IN A BUILDING

BACKGROUND

This disclosure relates to an automation system and, more particularly, to an automation system for deployment in a building.

In multi-room buildings, each room often has devices such as thermostats, light switches, controllers, etc. installed therein. Recently, as it has become possible to provide such devices with high performance micro-processors and networking capabilities and as the Internet of Things (IoT) has become more popular and desired, many buildings have begun upgrading their systems. Thus, hotels, dormitories, senior living facilities, hospitals, office buildings and so on now have systems of high performance and networked electrical devices installed in their respective rooms.

When such networked systems are deployed, the installer needs to configure each device with a system-unique network address so that the data stream originating from each device and arriving at a server external to the device can be properly associated with that device. Also, control commands that are issued external to the device and transported over the network need to be received and processed by the correct device. For example, if a mobile device is used to control the floor lamp in the living room, such command needs to be sent to only the living room floor lamp so that the command can be properly executed.

Configuring the network address for a device typically requires a user interface to initiate the process, an ability to select or set the desired network address and a way to associate the selected address with the device. This is often a manual operation, however, and has several drawbacks. Firstly, there could be human errors whereby an incorrect address is assigned to the device. Secondly, should a device be removed and transported to a different location, possibly even with a different operational purpose, there will be an integrity problem with the configuration. Thirdly, the process relies on trained personal and training cannot always be maintained in environment with high fluctuations. Lastly, the process is hampered if the tools are not available, or not up-to-date or technologically obsolete.

BRIEF DESCRIPTION

According to an aspect of the disclosure, an automation system is provided for deployment in a building with rooms. The automation system includes computing resources which are receptive of contextual information and an electronic device cluster in each room. Each electronic device cluster includes electronic devices at least one of which gathers environmental information within the room and at least one of which communicates the environmental information to the computing resources. Location and use descriptors of one or more electronic devices of a portion of the electronic device clusters are undefined for the computing resources at an initial time and the computing resources are configured to compare the contextual and environmental information from at least one electronic device cluster, identify a location and a use of the one or more electronic devices of the portion of the electronic device clusters based on comparison results and assign location and use descriptors to the one or more electronic devices accordingly, and communicate with the one or more electronic devices using the location and use descriptors.

In accordance with additional or alternative embodiments, the computing resources are provided in at least one of a server, a Cloud computing element and at least a portion of the electronic devices of at least a portion of the electronic device clusters.

In accordance with additional or alternative embodiments, the contextual information includes a type and use of each electronic device in each electronic device cluster and a number of each type and use of electronic device.

In accordance with additional or alternative embodiments, the environmental information includes records of electronic device activities, relative electronic device locations and evidence of electronic device proximities.

In accordance with additional or alternative embodiments, the location and use descriptors are network address components.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

The following description relates to an automation system and method that fully automates a configuration of network addresses of devices that are part of a building automation system. The system uses contextual information in the form of building model data and a set of environmental parameters that can be sensed by the devices themselves in a continuous monitoring process to insure that configuration integrity is maintained and automatically corrected. The system generally relies on "context driven clustering" in which, if a sufficient amount of information can be provided as a model and can be augmented with a sufficient amount of information that can be sensed by the devices, it is possible through logical and probabilistic reasoning to group devices together and assign them their network addresses. The following description will also show how a multi-factor authentication algorithm can be applied so that a bootstrapping trust relationship can be created.

Building automation systems include a large number of devices such as thermostats, light switches, drapery motors, sensors and indicators, controllers, alarm panels, etc. These device are often networked with each other through wired and wireless connections. The network allows for the transmission of sensor data to controllers and for the transmission of actuation commands from controllers to actuating devices. Additionally, networks allow for sensor data to be logged at remote locations, such as databases hosted by a server on premises or in the Cloud. In addition, control commands, reconfiguration commands and software updates can be transmitted over the networks to the individual devices.

For a system to work properly, it often needs to be properly configured. In particular, the network addresses of the participating devices need to be configured correctly. For example, a house might have two thermostats, one on the first floor and one on the second floor. If these thermostats were to be incorrectly configured or swapped, the data arriving from seemingly the first floor thermostat really describes the situation on the second floor and vice versa. This would make a proper diagnosis of a situation difficult and remotely controlling setpoints of the thermostats would be a frustrating experience for the building inhabitants. Even if only one of the thermostats were incorrectly configured and both are configured as being located downstairs, it would be very difficult to determine which data stream is coming from the real downstairs thermostat and which data stream is coming from the wrong thermostat.

Thus, when devices are installed or replaced during maintenance, they need to obtain the correct network address so that such issues can be avoided. While this type of maintenance can be simple for a small set of devices over a short time period, doing the same for a scaled system over a long time period can be challenging because system configurations tend to degrade over time due to the accumulation of technical glitches and operator errors.

Configuring a network address for a device typically requires a user interface to initiate the process, an ability to select or set the desired network address and a way to associate the selected address with the device. The user interface can be an integral part of the device. For example, if the device has a display and a keypad, then it is often possible to enter a service menu of the device that then allows one to set the network address. In other cases, an external user interface is used to broadcast a command that states the network address of a device needing to be configured and the device has a feature that if such a command has been received in the recent past and a given action is taken, the device accepts the broadcasted information as its new network address. For example, in a room automation system, the configuration command for "room 123, curtain controller" or "room 123, device address 123-47" may be sent. If a small push button on the curtain controller were then tapped three times, the curtain controller would accept the transmitted information as its network identifier.

Network address association can be at the device level or external. In the former case, the address to be set is sent to the device where it is also stored and then used for all future communication needs of the device. An alternate form would be that the device is using solely its unique identifier, such as an IEEE MAC address, and where the logical assignment to a particular address is performed at a router or server. This technique is called a network address translation (NAT) where an external command addressed to a particular device, such as "room 123, curtain controller" would be translated to a technical MAC address such as 03:FE:23:00:09:17:07:DB. Conversely, data packets that originate from the device with the stated MAC address would be translated at the NAT-ing device as data originating from "room 123, curtain controller". From a stand-point of usability, the method of storing the application network address in the device or performing a NAT function at an external component is equivalent.

Regardless, the conventional processes are intrinsically human-driven and success is based on a number of assumptions that, when not realized, will lead to non-existent or incorrect network address assignments. For example, the person configuring a device might plainly assign an incorrect address. This could result from simple operator error or an inconsistent interpretation of information.

Also, while many devices in building automation systems are considered to be fixed, they may not actually be fixed. If a device malfunctions, it can be removed and replaced with a different device. Some devices are even more portable, such as plug-in lamps or entertainment system devices. These devices might first be located in a family room and end-up in a study or a bedroom. In commercial environments, such as a hotel, a working device might be borrowed from an unused room in order to quickly solve an issue in another room. In each case, the moving device need to be re-configured every time they are moved. Further, in order to achieve a consistent configuration of high integrity, the process of network address configuration needs to be well understood but is often not well understood. In addition, devices of building automation systems tend to have a fairly long life-cycle and it is not uncommon that such systems are operated and maintained in an excess of twenty years. Tools used to configure these systems often have their own life cycle, especially if the tool is based on off-the-shelf devices such as tablets, mobile devices, etc. Therefore, it can be difficult to find or get support for tools to maintain a system after a certain time.

The stated drawbacks would not be present if devices in a building automation system could configure their network address autonomously. The following description details how this can be achieved and how such a system can be used to continuously monitor the building automation system to detect and correct configuration anomalies.

Figure 1:
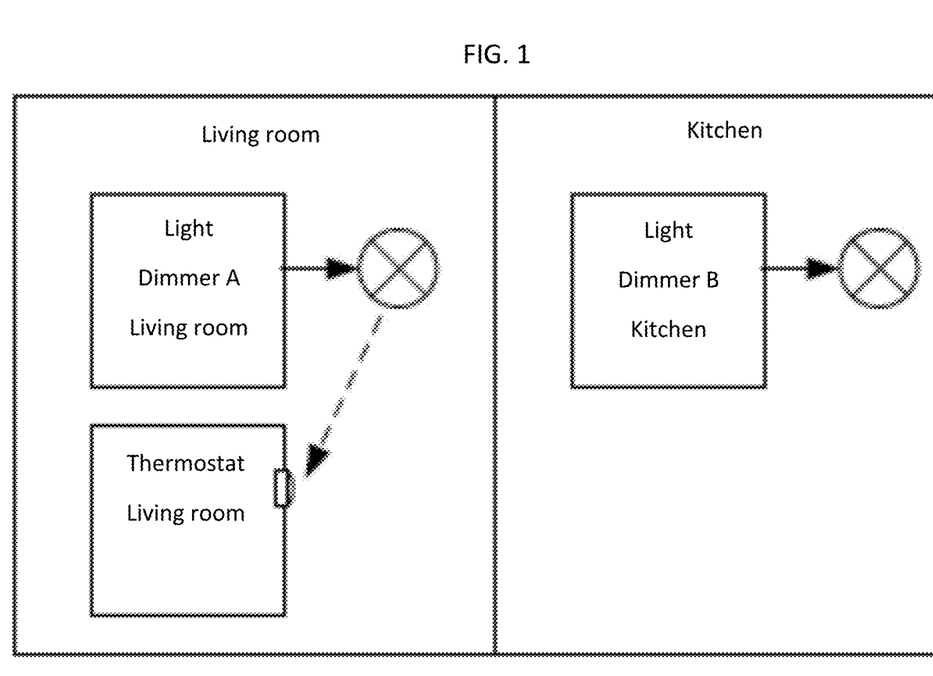
FIG. 1 shows a simple example of a home with a few devices that can be auto-configured with an external model description.

With reference to FIG. 1 and Table 1 below, a simple case of a home automation system is provided with a light dimmer A and a thermostat in the living room and another light dimmer B in the kitchen. The devices are each networkable with an RF radio, such as ZigBee, Z-Wave, WiFi or another standard or proprietary radio. Grouping all the devices together, we identify this as a cluster and name it "My house".

TABLE 1

Model
Cluster "My House"
  Enclosed Space "Living Room"
    Device "Light Dimmer"
    Device "Thermostat"
  Enclosed Space "Kitchen"
    Device "Light Dimmer"

In traditional systems, we would install the three devices and then configure their respective network setups according to the desired outcome. We would for example first go to the kitchen and assign the dimmer the network address for "Kitchen dimmer". Then we might go to the living room and assign the second dimmer the address that is associated with the "Living room dimmer". Lastly, we would go to the thermostat and assign it the "Living room thermostat" address. However, with the model captured and having sufficient sensors available to us, we can also just install the equipment and expect the devices to configure themselves. If each light dimmer in the living room and kitchen respectively procures a random control pattern for its controlled light bulb, then the thermostat equipped with a light sensor would be able to detect the pattern in the living room, but not from the kitchen. Through logical reasoning, we can state:

1. The thermostat is in the living room because the model contains only a single thermostat that is defined to be in the living room.

2. Light dimmer A must be in the living room because the thermostat can detect a characteristic light control pattern from light dimmer A but not from light dimmer B.

3. Light dimmer B must be in the kitchen because that is the only remaining device position.

In this very simple case, we could allow the three devices to be configured automatically and we group them to a cluster of this particular simple home.

Figure 2:
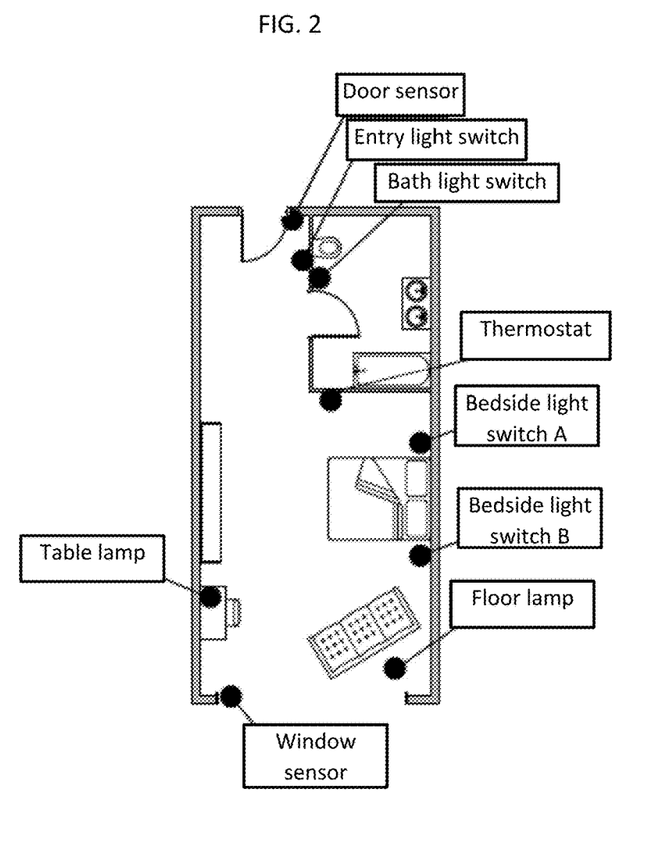
FIG. 2 shows a more complex building automation system in the form of a room automation system for a hotel.

With reference to FIG. 2 and Table 2 below, another example is provided. In a section of a building automation system, each device has an additional sensor capability in the form of a microphone and a small speaker. This allows each device to send and receive an acoustic signal to determine an approximate distance between the device and any other device in its vicinity. The distance could also be estimated if the receive signal strength indicator (RSSI) of the RF radios of each device is used. However, in buildings the RSSI is only useful for estimations of distance because of the randomness of the signal path loss due to obstructions such as walls, pipes, wires, furniture and son on. A more precise measurement of distance with the RF radio is to use a time-of-flight method where the delay between the transmission and the reception of the signal is being measured. Because RF signals travel at the speed of light, the devices need to have very finely synchronized clocks. For added complexity, one and the same device type is used for sensing the open/close state of the door and the window and the light switches for entry, bath and the two bedside positions are each the same device type and model. Lastly, the floor lamp and table lamp use the same dimmer module.

In order for this system to configure itself into a cohesive room automation system for a guestroom, the devices identify each other by measuring attributes and comparing this against the stated model that is outlined in Table 2. An iterative process that solves one puzzle piece after another will accomplish this task. If for example the light switch at the entry transmits an acoustic beacon signal, then the bathroom light switch is the only device of its kind that will be found to be close. Therefore, the entry light switch and bathroom light switch know that they form this entry-bath pair because they are the only light switches that are close to each other. However, they still do not yet know which one is the entry and which on is the bath light switch. The moment the door sensor sends an acoustic signal that can be measured at close proximity to the entry light switch device and a possibly long distance by the bath light switch, the resolution for the three devices in the vicinity of the entry is complete. At this point, it is known that the three devices cannot be the combination of the window sensor and the two bedside switches because the distances just do not match. In a similar fashion, the two bedside switches can estimate acoustically the respective distance to the thermostat which has them properly identified as well. Similarly, the lamp dimmer that is proximate to the bedside switch B must be the floor lamp and through a process of elimination it can be determined that the remaining lamp dimmer must be the table lamp. The remaining sensor would then be known to be the window sensor as it is not close to any light switch.

TABLE 2

Model
Cluster "My Hotel Room"
  Enclosed Space "Standard Room"
    Device "Door Sensor", attribute
    "1.2 meter from entry light switch"
    Device "Entry light switch", attribute
    "0.3 meter from bath light switch", "separated by wall"
    Device "Thermostat"
    Device "Bedside Light Switch A", attribute "
    2.2 meter from thermostat"
    Device "Bedside Light Switch B", attribute
    "4.1 meter from thermostat"
    Device "Floor Lamp", attribute
    "2.0 meter from Bedside Light Switch B"
    Device "Window Sensor", attribute
    "6.1 meter from Bedside Light Switch B"
    Device "Table Lamp", attribute
    "5.5 meter from Bedside Light Switch B"

In case acoustic signals could not be used, data gathered from the door sensor and the entry light switch can be correlated with a number of possible bath light switches in nearby communication and operational patterns may be analyzed. For example, the heuristic can be stated that if a door opens, for a short time, there will be an increased (above average) likelihood that the bath light will be operated. A similar heuristic can be stated that the operation of the entry light switch shows a positive correlation with the operation of a bath light switch. Running a set of nearby unassigned light switches against these heuristics will quickly identify which remaining light switch is the missing bath light switch.

Another pressing matter is that we do not necessarily want such as system to continuously configure itself or verify its configuration since acoustic beacons being sent back and forth could be rather bothersome to an occupant. As such, the acoustic beacons could use ultrasonic frequencies which cannot be heard by humans or an occupancy sensing algorithm can be employed. That is, when the entry door closes and the motion sensor does not see any motion for a specified time, then the space will be declared as unoccupied and the devices in this room are allowed to transmit their acoustic beacon signals. Once a configuration has been established or confirmed, there is very little need to keep re-confirming at a high rate and devices may only need to initiate a verification of their location at a higher priority after they have been powered up or moved.

Figure 3:
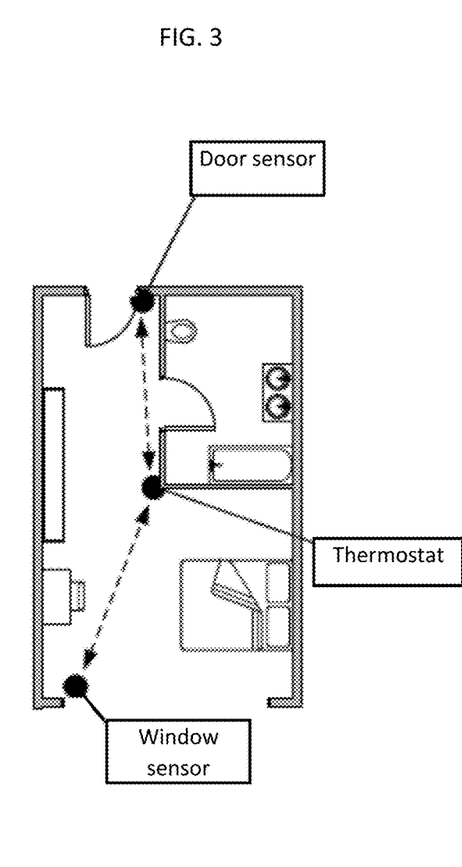
FIG. 3 shows a building automation system that is symmetrical and requires enhanced modeling techniques to resolve its devices.

With reference to FIG. 3 and Tables 3 and 4, a simple room includes just three devices. There is a thermostat in the middle of the room and two sensors of the same type at the entry door and the window. Because the acoustic distance between the thermostat and each sensor is the same, doing a device resolution based on spatial information is not possible. Here, acoustic distance measurement can still be used to identify that the two sensors are located in the same room and allows an automatic clustering of the three devices.

As shown in Model 1 of Table 3, the operational patterns of the sensors can be used. For the first sensor, we define that it tracks the open/close status of an entry door. For the second sensor, we define that it tracks the open/close status of a window or balcony of the room. If for example the heuristics state that an entry door is operated about five times more often than a window, after gathering a sufficient amount of data and, as a significant difference starts to appear between the two sensors, the sensors can be differentiated based on their operational frequency. Another rule that could be applied would be that during night hours, entry doors are not opened for prolonged time periods while windows are. Another rule that could be applied is that when a window is opened, significant changes to room temperature or air humidity can occur which does not happen when a door into a conditioned hallway is being opened. This statement can further be enhanced if the impact on temperature and air humidity is being tracked in other rooms of the same building where the resolution between the door and window sensor has already been performed.

TABLE 3

Model 1
Cluster "My Hotel Room"
  Enclosed Space "Standard Room"
    Device "Door Sensor", attribute "sensing of entry door"
    Device "Thermostat"
    Device "Window Sensor", attribute "sensing of window"

As shown in Model 2 of Table 4, we state that the door sensor is mounted in the hallway while the window sensor is mounted in the area of the main room. The acoustics in a hallway is quite different than in a larger room. In hallways, such as entry door areas as depicted, a transmitted acoustic beacon of the sensor device has very significant echoes and standing waves. This acoustic characteristic cannot be observed in the much larger main room area and where carpets, bed linen and draperies absorb a large amount of acoustic energy. In this case, each of the two sensors would transmit an acoustic beacon and then directly switch-over to receive mode to track the echo of their own transmission. Evaluating the distinct signal patterns and the decay of the acoustic energy in the time domain allows to differentiate the location for each sensor.

TABLE 4

Model 2
Cluster "My Hotel Room"
  Enclosed Space "Standard Room"
    Device "Door Sensor", attribute "mounted in hallway"
    Device "Thermostat"
    Device "Window Sensor", attribute "mounted in room"

Empirical measurements have shown that good acoustic frequencies are in the range of 1-4 kHz and can be produced and received with fairly small sized speakers and microphones and the sound waves propagate well through the interior of buildings. Also, these frequencies can penetrate thinner non-isolated walls and interior doors with an acceptable signal loss. This property allows that there are trilateration possibilities even across different rooms in a dwelling as long as the separations are not too massive. To transmit, it is recommended to use a crystal-based frequency that outputs its wave form to the amplifier and speaker. On the receiving side, the signal from the microphone is sampled with at least two times the carrier frequency in order to meet the Nyquist criteria. Performing digital signal processing, such as an FFT on the expected signal durations, will yield an acoustic power level in the time domain. Assuming a fixed speed of sound, the acoustic signal power in the time domain translates directly into the distance the signal has travelled since the transmission. This is also often referred to as a time-of-flight system. Acoustic signal transmission works equally well between two different devices as it works if a single device sends a signal and then listens for the echo. The later variant is similar to Sonar used in submarines.

Figure 4A:
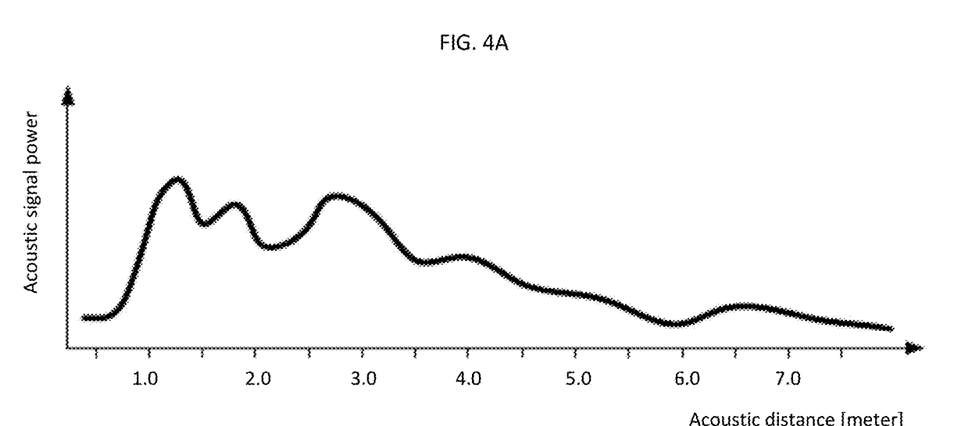
FIG. 4A shows an acoustic echo pattern of a device that is mounted in a typical hallway.
Figure 4B:
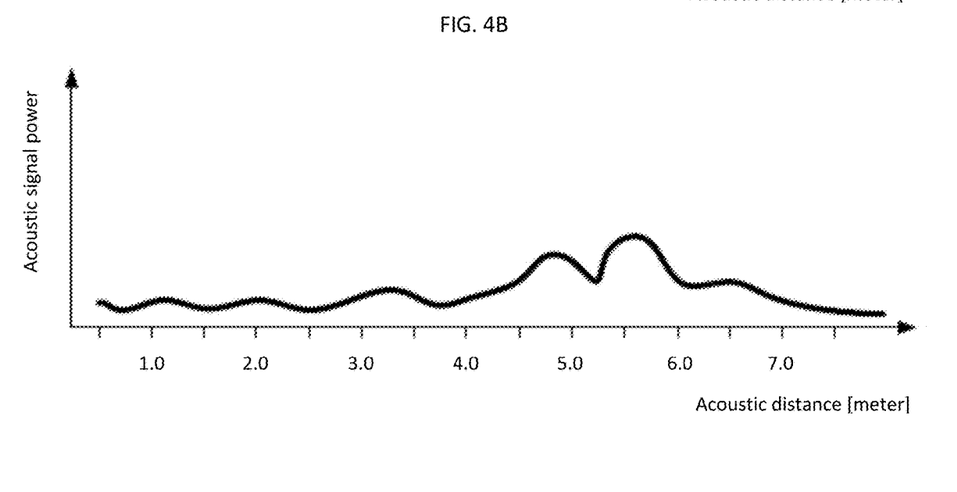
FIG. 4B shows an acoustic echo pattern of a device that is mounted facing a somewhat larger open area.

With reference to FIG. 4A, the basic characteristics of an echo signal of a device placed in a typical hallway are shown. The echo signal is strong and has pronounced power levels at relatively short distances. This is due to the fact that the acoustic signals tends to bounce heavily back-and-forth the walls of the entry way and between the walls, the ceiling, the door and the floor. With reference to FIG. 4B, an echo signal that is received by a device that is facing a somewhat open room with furniture and fabric to absorb the acoustic signal is shown. The receiving echo pattern has increased amplitudes at a much greater distance and the power level is much less pronounced. The acoustic power patterns of FIGS. 4A and 4B are sufficiently different in their nature that they can be used to make precise assessments if a device is placed in a narrow hallway or in an open space. This property allow for the differentiation of the two sensors presented in FIG. 3.

Figure 5:
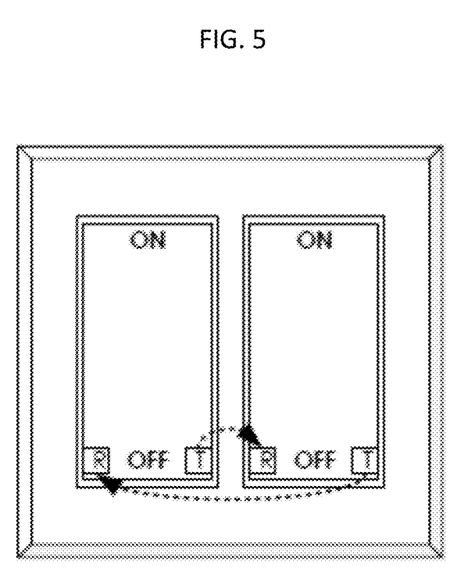
FIG. 5 shows an arrangement where devices are disposed very close together.

With reference to FIG. 5, devices may be positioned very close together, such as in the example of placing multiple light dimmers into a double or triple gang wallbox. If the speaker and microphone for these were positioned very close together, then each device would measure the same distance to its neighbor. If this were the case, it would not allow the devices to determine if they are installed in the left or right gang of the wallbox. Here, the wallbox devices may be provided with an up/down orientation with the speakers and microphones disposed asymmetrically along the vertical product axis. This assures a significantly shorter transmission distance in one direction and a significantly longer distance in the other direction. If, for example, as shown in FIG. 5, the speaker is mounted on the right and the microphone on the left of the product, then if a receiving device B detects its distance to be close to a neighbor device A, but the device A detects a longer distance to its neighbor B in return, we can conclude that the device B must be to the right of device A. This feature is important for multi-gang applications where one device for example controls the kitchen lights where as a second device controls the hallway light. If we want to assure that we can track the state of each of these lights correctly and for assuring that we can control these lights from remote locations correctly, then we require that these devices are properly resolved within their multi-gang environment. Using an asymmetric left-right placement of the speaker and microphone achieves this.

So far, we have looked how the devices of a single context are grouped and addressed. A single context for example could be a residential dwelling, or it could be a single room or suite in a hotel, dormitory, hospital or similar environment. Once the clusters have formed, we still might want to identify the logical identification of the cluster, in particular if the building system contains many such clusters, such as in a hotel, dormitory, hospital and the like. This means generally that each cluster needs to be associated with a logical identifier, such as the room number as when used in a hotel.

Cyber security is a particular concern of networked building automation systems and IoT systems in general. These systems often require that the devices be addressed and secured to the point that they are not vulnerable to cyber security attacks. This may be achieved by providing a device with a secret communication key. Devices can receive a key either through a side-channel configuration or through secure key exchange algorithms, such as RSA, or elliptic curve Diffie-Hellman key exchange. In traditional building automation systems, the setting of the cyber security credentials is typically combined with the overall configuration of the devices' network address. Loading a secret key into a device requires proper authorization and authentication. Assuming that the selected side-channel key exchange is secure or that an approved cryptographically secure key exchange algorithm is used, the remaining issue will be determining how the receiving device knows that the device that transmits the key has the authority to do so (i.e., a bearer token can be verified and the devices may have the ability to store the secret in a manner that makes it sufficiently difficult to access or tamper with the stated token).

The standard three factors of authentication are "What you know", "What you have" and "What you are". For example, if a system wants to authenticate a person with multi-factor authentication, the solutions might be that a pin-code or password would provide an element of the "What you know" factor, an RFID batch or object with a hologram would fall into the category "What you have" and a fingerprint or eye scan would satisfy the "What you are".

Figure 6:
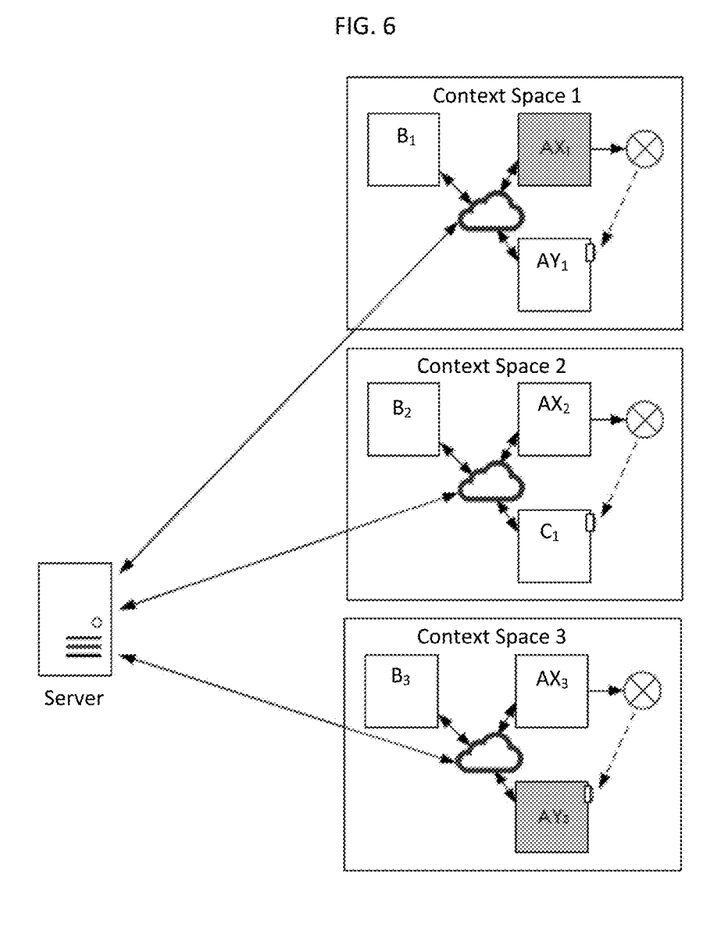
FIG. 6 shows a series of context spaces that allow for a shared-experience by a set of devices and how these context spaces can be used to support device management during the system maintenance phase.

With reference to FIG. 6, a scaled building automation system that includes three context spaces is provided. Each context space includes a number of different devices, such as a device B from a first vendor and some devices AX and AY from a second vendor and some devices C from a third vendor. Each context space allows for a shared experience, such as is the case that if the context space is a room, the walls form a natural barrier for sound waves, light, humidity and other attributes that can be sensed. We assume that in context space 1, the device AX has failed and has been replaced with a spare part. When device AX in context space 1 starts-up, it undergoes an automatic network address assignment as outlined in the earlier parts of this document. The device AX broadcasts on the RF network a non-encrypted announcement of its device type (I am a "AX" device) and that it is just about to start an acoustic trilateration operation. By sending an acoustic beacon, it allows the two receiving devices B and AY to confirm that the device AX is in the same space. Based on this fact, the B or AY device can assign the new AX device its network address.

To confirm the authenticity of the new device AX, once the network address has been provided, the server will then send a challenge code to the device AX in context space 1. This challenge code is essentially a cryptographic random number. The device AX1 will then return a hashed result code based on the provided challenge. The server will select another identical device AX, such as can be found in context spaces 2 and 3 and one that is already fully secured. It issues an equivalent challenge to one of these two devices to confirm that the replacement AX device in context space 1 is not an imposter. After this operation, the context space 1 submits the security key to its AX device by relying on information that is fairly simple to sense when inside the context space and difficult to guess or sense when outside the space. We also call this the phase of establishing a shared experience. This is done by sensing a number of shared environmental patterns. For example, a first shared environmental pattern is when device B1 transmits a series of acoustic signals that can be received by AX1. Such a pattern could be for example a 128-bit random number with a cyclic redundancy check. If the AX device acknowledging the correct reception of the acoustic signal, a second similar random acoustic signal can be sent, this time by AY, towards the AX device. Assuming for a moment that AX is controlling a light, the AY device can request to control the light actuated by AX with a random pattern established by AX where the random pattern again contains a checksum so that the receiving device AY can verify that it has received a correct light pattern. This in turn can be detected and reported by another device in the same context space, in this case by a light sensor that is part of device AY. Other patterns can be distance measurements using the time it takes soundwaves to travel between the AX device and the other established devices. Another pattern, albeit a relatively slow one, would be if device AX contains a temperature sensor and device B, as a thermostat, creates a specific fluctuation in the temperature of the space. And yet another pattern can be shared for example if the AX and another nearby device each have a motion sensor where the motion pattern itself is the pattern code. Each of these patterns establishes an artifact that is difficult to guess when not present in the context space. In summary, one pattern establishes that device AX1 can hear signals from device B1. Another pattern establishes that device AX1 can hear signals from device AY1. Another pattern establishes that device AX1 can control a load in the context space and so on.

Figure 7:
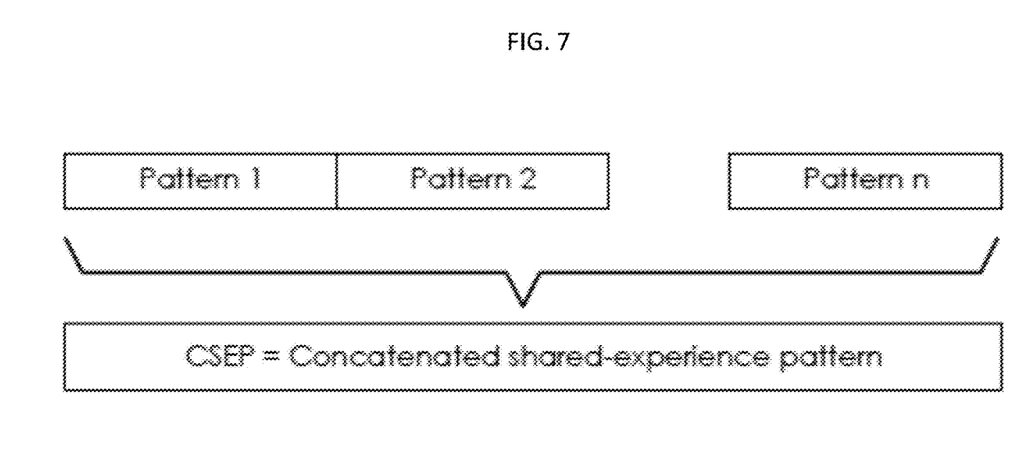
FIG. 7 shows how individual shared-experience patterns are aligned to form a concatenated shared-experience pattern.

With reference to FIG. 7, the patterns can be concatenated to form a single, multi-segmented pattern. The individual patterns are ordered in the sequence the patterns were established and the overall concatenated pattern is called in short the CSEP for Concatenated Shared-Experience Pattern.

Figure 8:
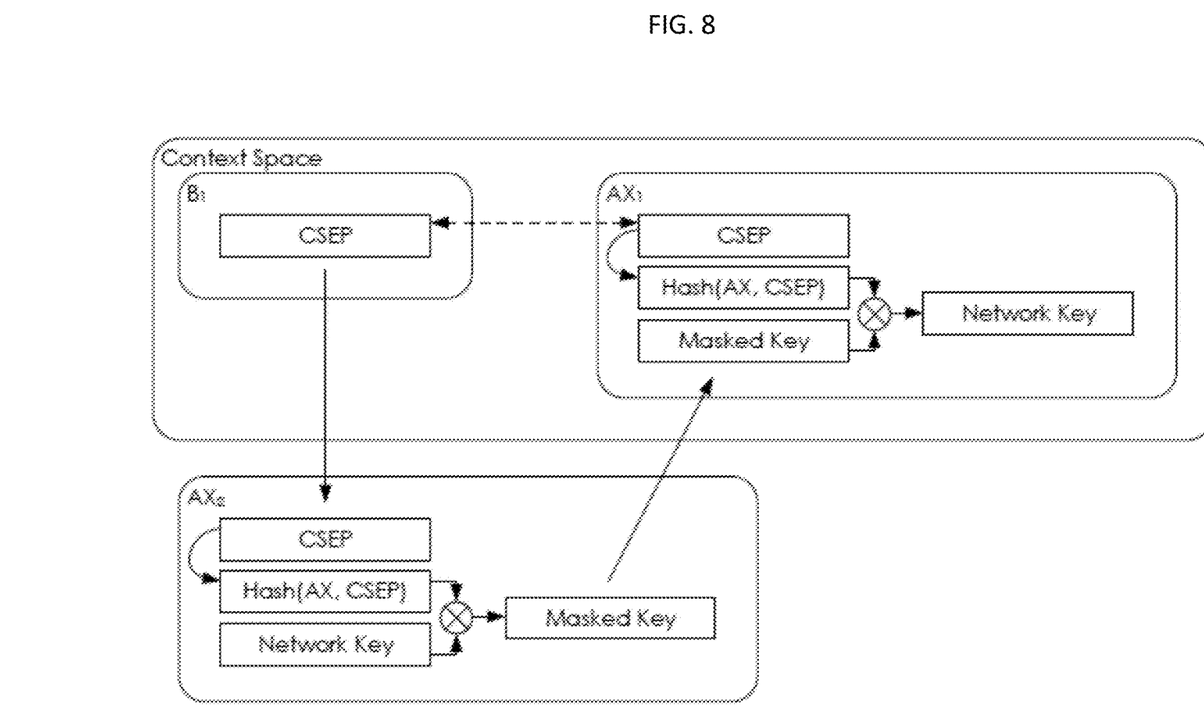
FIG. 8 shows how a concatenated shared-experience pattern can be used to exchange network credentials in a building automation system.

With reference to FIG. 8, the CSEP can be used as part of a key exchange protocol. The more patterns are defined and the more varied the sensors and sensing requirements are, the more difficult it would be for an attacker to provide a means to obtain these patterns without being present in the room. Because device AX1 assembled the same patterns as the other devices in the context space, and the patterns have not been communicated without encryption over the RF radio, they can be assumed to be private. This would allow the CSEP to be used directly as the encryption key to transmit the network security credentials from the established devices, such as B1 or AY1, to the new AX1 device. However, this has the vulnerability that if an attacker were to be present in the room and implants an alternate AX device, he could capture the various patterns and therefore intercept the exchange of the network credentials. To address this issue, and making use of the fact that device type AX is assumed to have not been breached, the concatenated pattern is sent securely from context space 1 by one of the devices that is fully secured, to another established AX device, such as AX2 in context space 2. AX2 hashes the concatenated pattern and performs an XOR operation with the final network key. This result is sent back to context space 1 and transmitted to AX1. AX1 in turn performs the same hash on the concatenated pattern and based on the output of AX2 can generate and extract the network key.

This scheme performs a multi-factor authentication. The attacker needs to be present or have established an auxiliary sensor system to obtain the described shared-experience patterns. Second, the attacker needs to have access to a breached target device type that is not yet tagged as breached. This provides a degree of protection even against insider attackers who have access to the design and source code information of device AX and to attackers who have access to the premise. To rephrase, this key exchange is based on two secrets. The CSEP requires access to the context space, the hash function for device AX requires manufacturers information of the device.

When an entirely new system is being deployed, the initial key exchange based on a shared-experience may not work until at least all device types have been secured manually. For this reason, the described solution can be considered a more practical solution during maintenance phases where a small number of somewhat distributed devices are being replaced and then bootstrapped by the system. Also, if a device type gets breached and can no longer be assumed to be safe, the system overall has not necessarily become unsafe. As long as the network keys cannot be read-back from the breached device, earlier network bindings stay secured. If one wants to defend against a possible later breach that can be combined with a CSEP obtained by an intruder at one point in time, it is possible that the system occasionally schedules new keys to a fully operating system as to make it even more involved for an attacker to know the current keys of the system.

Figure 9:
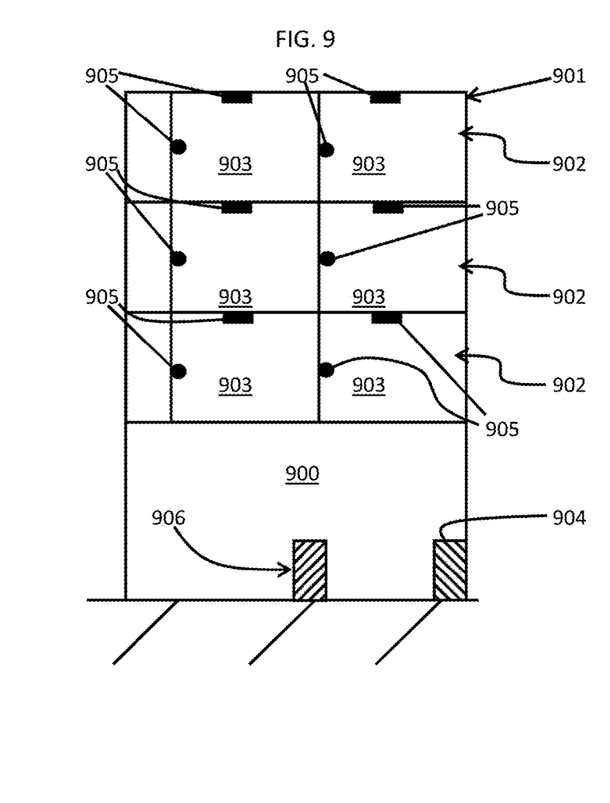
FIG. 9 is a schematic illustration of a building in which an automation system is deployed in accordance with embodiments.
Figure 10:
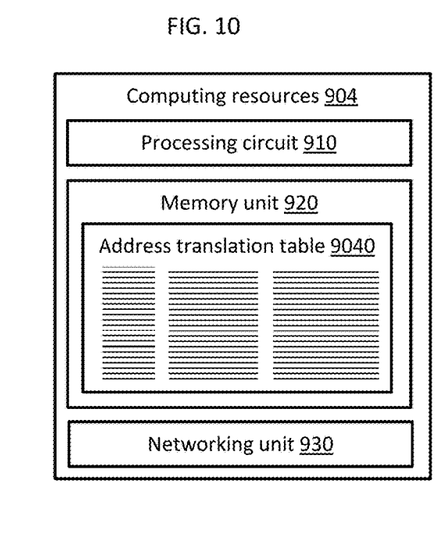
FIG. 10 is a schematic illustration of a server of the automation system of FIG. 9 in accordance with embodiments.
Figure 11:
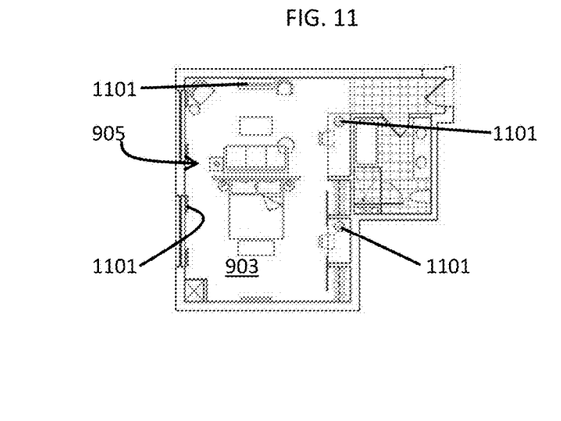
FIG. 11 is a top down plan view of a room in the building of FIG. 9 in which an electronic device cluster is disposed in accordance with embodiments.

With reference to FIGS. 9-11, an automation system 900 is provided for deployment in a building 901 with multiple floors 902 and multiple rooms 903 on each of the multiple floors 902. In accordance with embodiments, the building 901 may be configured as a hotel, a dormitory, a senior living facility, a hospital, an office building, etc. As shown in FIGS. 9 and 11, the automation system 900 includes computing resources 904 or a server as well as an electronic device cluster 905 that is installed in or otherwise resides in each of the multiple rooms 903 and, in some cases, a property management system 906. In accordance with embodiments, the computing resources 904 may be distributed among the electronic device clusters 905 (e.g., among at least a portion of electronic devices 1101 to be described below of at least a portion of the electronic device clusters 905), embodied in a server disposed within the building 901, provided in a Cloud computing element or may be disposed remotely with respect to the building 901. However, for purposes of clarity and brevity, the illustration in FIG. 9 and the following description will relate to the case of the computing resources 904 being distributed among the electronic device clusters 905.

In any case, the computing resources 904 are receptive of contextual information that describes structural features of the building 901, arrangements and composition of the electronic device clusters 905 and configurations and usage capabilities of the electronic devices 1101 of the electronic device clusters 905. In accordance with embodiments, the contextual information received by the computing resources 904 may include a type and use of each electronic device 1101 in each electronic device cluster 905 and a number of each type and use of electronic device 1101.

In accordance with further embodiments, the contextual information received by the computing resources 904 may include a model of the building 901 that describes the electronic devices 1101 of each cluster 905 and one or multiple attributes for each of the electronic devices 1101. In some cases, the description may relate to a device type or device model and to a number of such device types or device models. Nevertheless, location and use descriptors of one or more electronic devices 1101 of a portion of the electronic device clusters 905 are undefined for the computing resources 904 at an initial time.

As shown in FIG. 10, the computing resources 904 may include a processing circuit 910, a memory unit 920 and a networking unit 930. The processing circuit 910 may be provided as a micro-processor or another suitable processing element. The networking unit 930 permits communications between the processing circuit 910, the electronic device cluster 905 in each of the multiple rooms 903 and, where applicable, the property management system 906. The memory unit 920 has executable instructions stored thereon which are executable by the processing circuit 910. When executed, the executable instructions cause the processing circuit 910 to operate as described herein.

As shown in FIG. 11, each electronic device cluster 905 in each room 903 includes the electronic devices 1101. The electronic devices 1101 may be provided as one or more of light switches, thermostats, dimmer controllers, drapery controllers, motion sensors and other sensors. At least one of the electronic devices 1101 is configured to sense a condition within the room 903 and to gather environmental information within the room 903. At least one of the electronic devices 1001 is configured to report sensing results and the environmental information to the computing resources 904.

In accordance with embodiments, multiple electronic devices 1101 may be configured to sense one or more conditions within the room 903 and to gather environmental information within the room 903 and multiple electronic devices 1101 may be configured to report one or more sensing results and the environmental information to the computing resources 904. In some cases, one or more electronic devices 1101 may be configured to sense one or more conditions within the room 903 and to gather environmental information within the room 903 and to report one or more sensing results and the environmental information to the computing resources 904. In those cases, where one or more of the electronic devices 1101 is reliant upon another one or more of the electronic devices 1101 for reporting to the computing resources 904, the electronic devices 1101 may be communicative with each other.

In any case, the processing circuit 910 of the computing resources 904 is receptive of the contextual information and the sensing results and the environmental information from the at least one electronic device 1101 in each electronic device cluster 905 in each room 903 by way of the networking unit 930. The computing resources 904 may also be receptive of external information from the property management system 906, where the property management system 906 is provided, by way of the networking unit 930.

In accordance with embodiments, the sensed condition may include or relate to at least one of a lighting condition within the room 903, an environmental condition within the room 903, energy usage within the room 903, water usage within the room 903, audio/visual purchases within the room 903 and minibar consumption within the room 903. In accordance with embodiments, the environmental information gathered may include records of electronic device activities, relative electronic device locations and evidence of electronic device proximities. Here, relative electronic device locations and proximities can be measured through time-of-flight for acoustic signals, received signal strength indications of acoustic signals, time-of-flight of radio frequency signals, or receive signal strength indications of radio signals. The environmental information may also include operational parameters, such as frequency of use or usage by time of day of each of the electronic devices 1101, acoustic time-of-flight or motion sensor signals, or temperature, humidity, levels of volatile organic chemicals present, light levels, noise levels or magnetic compass readings.

At least at an initial time, such as a new system installation event, a power-down and restart incident or a maintenance event, respective location and use descriptors of one or more electronic devices 1101 of a portion of the electronic device clusters 905 are undefined for the computing resources 904 at an initial time. Here, the term "undefined" can refer to the computing resources 904 having no record of the location and use descriptors of electronic devices 1101 of certain electronic device clusters 905 (i.e., as in a new system installation) or to the computing resources 904 having an incorrect record (i.e., as a result of a maintenance event in which an electronic device 1101 is moved from one location to another without being manually reconfigured).

Figure 12:
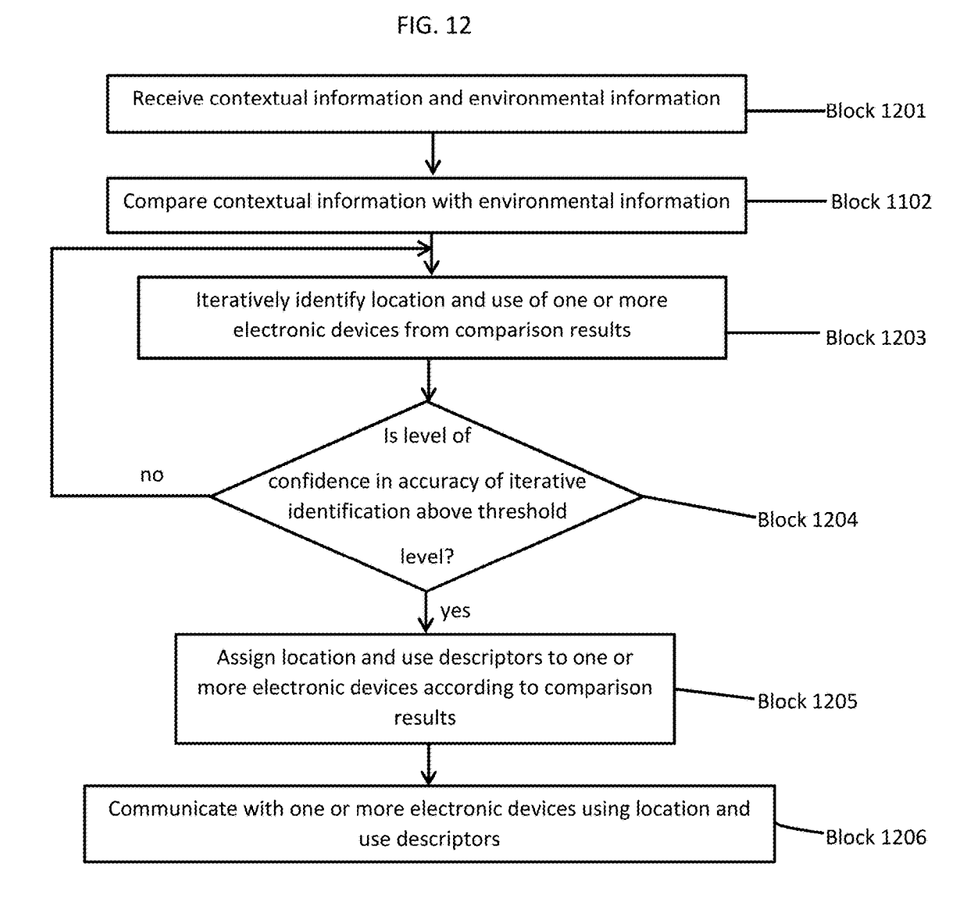
FIG. 12 is a flow diagram illustration an operation of an automation system in accordance with embodiments.

With reference to FIG. 12, the processing circuit 910 of the computing resources 904 is initially receptive of the contextual information and further receptive of the environmental information from the at least one electronic device 1101 in each electronic device cluster 905 in each room 903 by way of the networking unit 930 (block 1201). The processing circuit 910 and thus the computing resources 904 are further configured to compare the contextual and environmental information from at least one electronic device cluster 905 (block 1202) and iteratively identify a location and a use of the one or more electronic devices 1101 of the portion of the electronic device clusters 905 based on comparison results (block 1203). At this point, the processing circuit 910 determines whether a level of confidence in the iterative identifications are above a predefined threshold or not (block 1204). If not, control reverts to the iterative identifications of block 1203. If so, the processing circuit 910 assigns location and use descriptors to the one or more electronic devices 1101 according to the comparison results (block 1205) and subsequently communicates with the one or more electronic devices 1101 using the location and use descriptors (block 1206).

In accordance with embodiments, the location and use descriptors of the electronic devices 1101 may include network address components. That is, in assigning location and use descriptors to electronic devices 1101, the processing circuit 910 effectively provides for a self-configuring or self-correcting building automation system.

In accordance with embodiments, the processing circuit 910 iteratively identifies the location and the use of the one or more electronic devices 1101 of the portion of the electronic device clusters 905 based on results of the comparison between contextual information and the environmental information. The processing circuit 910 does this by executing the methods and algorithms described herein. For example, where the contextual information indicates that a room, such as the room of FIG. 2, includes an entryway, a bathroom next to the entryway, a bedding area beyond the bathroom and a window and that the room includes two sensors (where one is at the door and one is at the window but it is initially unknown which of the two sensors is at the door and which of the two sensors is at the window), four light switches (where one is at the entryway, one is in the bathroom and two are bedside but it is initially unknown which of the four light switches is at the entryway, which of the four light switches is in the bathroom and which of the four light switches are at either sides of the bed), two lamps (where one is a floor lamp and one is a table lamp but it is unknown which is the floor lamp and which is the table lamp) and one thermostat, the processing circuit 910 can use the comparison between the contextual information and the environmental information to eventually identify which of each device is in which location for a given use. That is, the processing circuit 910 eventually identifies which of the four light switches is the bathroom light switch and so on.

Thereafter, the processing circuit 910 may generate an address translation table 9040 (see FIG. 10), which is storable in the memory unit 920 and which serves to correlate identified locations and uses of the one or more electronic devices 1101 of the portion of the electronic device clusters 905 (e.g., which of the four light switches is the bathroom light switch and so on) with other logical information.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An automation system for deployment in a building with rooms, the automation system comprising:
   computing resources which are receptive of contextual information; and
   an electronic device cluster in each room, each electronic device cluster comprising electronic devices, wherein:
   at least one of the electronic devices in the electronic device cluster gathers environmental information within the room,
   at least one of the electronic devices in the electronic device cluster communicates the environmental information to the computing resources,
   multiple electronic devices in the electronic device cluster are used differently from other electronic devices in the electronic device cluster,
   the contextual information describes contents of the electronic device cluster and at least one attribute of each element of the contents,
   location and use descriptors of one or more electronic devices of a portion of the electronic device clusters are undefined for the computing resources at an initial time, and
   the computing resources are configured to:
   control the electronic devices in each electronic device cluster to generate the environmental information from interactions between various ones of the multiple electronic devices that are used differently from the other electronic devices in each of the electronic device clusters, compare the generated environmental information with the contents and the at least one attributes of the contextual information from at least one of the electronic device clusters, identify a location and a use of the one or more electronic devices of the portion of the electronic device clusters based on comparison results indicating correlations between the generated environmental information and the contents and the at least one attributes of the contextual information, assign location and use descriptors to the one or more electronic devices accordingly, and communicate with the one or more electronic devices using the location and use descriptors.

2. The automation system according to claim 1, wherein the computing resources are provided in at least one of a server, a Cloud computing element and at least a portion of the electronic devices of at least a portion of the electronic device clusters.

3. The automation system according to claim 1, wherein the contextual information comprises a type and use of each electronic device in each electronic device cluster and a number of each type and use of electronic device.

4. The automation system according to claim 3, wherein the environmental information comprises records of electronic device activities, relative electronic device locations and evidence of electronic device proximities.

5. The automation system according to claim 1, wherein the location and use descriptors are network address components.

* * * * *